Aug. 13, 1963
C. M. CHRISTIE
3,100,676
METHOD FOR MANUFACTURING A PRINTING ROLL
Filed Aug. 26, 1957
2 Sheets-Sheet 1
Fig. 1.
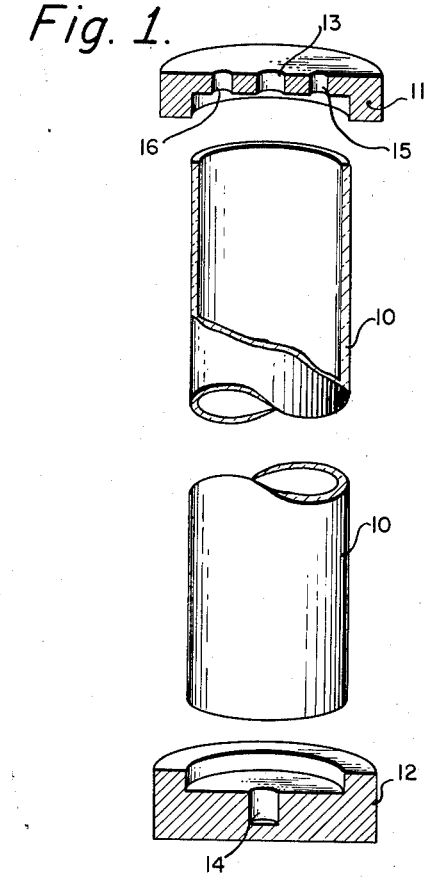
Fig. 2.
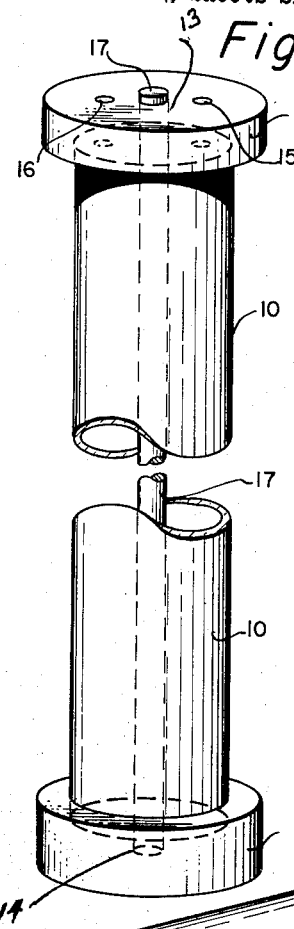
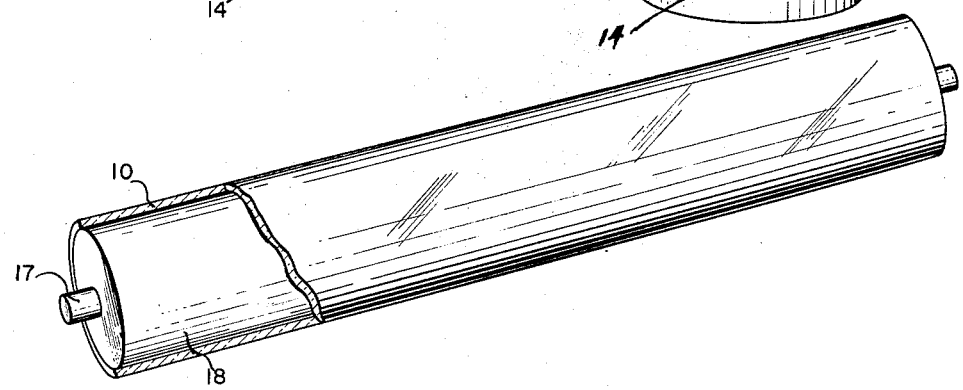
Fig. 4.
Clowes M. Christie,
*INVENTOR.*
BY
*ATTORNEY.*

Aug. 13, 1963  C. M. CHRISTIE  3,100,676
METHOD FOR MANUFACTURING A PRINTING ROLL
Filed Aug. 26, 1957  2 Sheets-Sheet 2
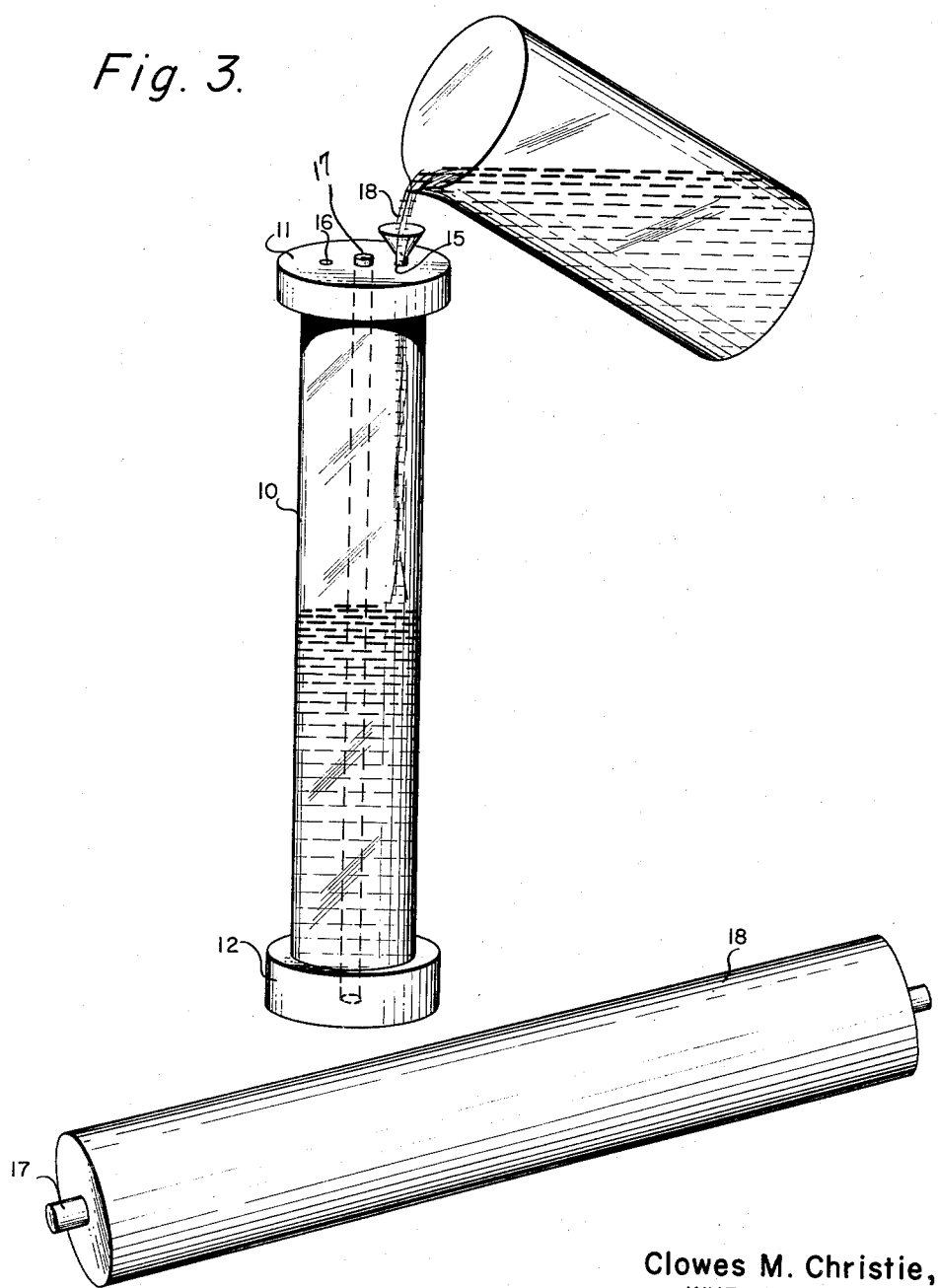
Clowes M. Christie,
INVENTOR.
BY.
ATTORNEY.

ic patent office 3,100,676
Patented Aug. 13, 1963

3,100,676
METHOD FOR MANUFACTURING A
PRINTING ROLL
Clowes M. Christie, Rolling Hills, Calif., assignor to American Latex Products Corporation, Hawthorne, Calif., a corporation of California
Filed Aug. 26, 1957, Ser. No. 680,201
1 Claim. (Cl. 18—58)

The present invention relates to a method of manufacturing a printing roll.

The present invention relates in general to the manufacture of cast articles from elastomeric materials and to the method for the manufacture of such articles. It relates more particularly to the manufacture of printing rolls of elastomeric materials.

Printing rolls are generally formed of flexible, resilient materials designed to receive and transfer ink and for other purposes, generally in a train of rollers in a printing press or the like. The manufacture of such rolls from elastomeric materials, such as rubber, synthetic resins, and similar materials possessing elastomeric characteristics, is well known. The rolls are generally formed around a core and then ground or finished to a predetermined size. Attempts have been made to manufacture such rolls by casting or molding to a predetermined size, but such attempts have not been entirely successful due to the fact that the molded or cast products can only be removed from one-piece molds with difficulty, and when two-piece molds are used similar difficulties are encountered plus the fact that parting line irregularties are present which must be removed by grinding, thus preventing the attainment of the product in its final finished surface condition without such procedures. In addition to this, molds are relatively expensive and in order to obtain a completely smooth finish, molds having a highly polished internal surface must be utilized, which surface is difficult to obtain, and to maintain in any highly polished condition over any substantial period of use.

In accordance with the present invention, applicant has discovered that rolls in general, and printing rolls in particular, as well as other products, especially of a cylindrical nature, may be readily obtained by forming or casting them in molds or shells made of frangible and expendable material. For example, it has been found that rolls or similar cylindrical objects may be formed by casting of elastomeric material within glass tubes or shells and after the material has set or been cured, these frangible tubes or shells may then be broken or crushed and removed from the completed roll, leaving its surface intact and conforming exactly to the nature of the internal surface of the glass tube. Since glass tubes are generally in a highly polished and externally smooth condition, the surfaces of the resulting rolls are also in the same form, and products having a smooth and highly regular and polished surface may be readily obtained in this manner.

The invention may be described in greater detail with reference to the accompanying drawings, in which:

FIGURE 1 is a view, partly in elevation and partly in cross-section, of the mold elements utilized in the present invention.

FIG. 2 is a view in elevation and partly in cross-section illustrating an assembled mold of the invention prior to casting of the roll.

FIG. 3 is a view in elevation illustrating the casting of a roll utilizing a mold construction according to the invention.

FIG. 4 is a view in elevation and partly in cross-section illustrating the structure of a cast product within its shell prior to removal therefrom.

FIG. 5 is a view in elevation of a finished roll made in accordance with the invention.

Referring to the drawings, a cylindrical glass tube 10 having an internal diameter corresponding to the desired external diameter of a roll, and having a length corresponding to the desired length of the roll, is assembled between end members 11 and 12. These end members form caps enclosing the open ends of the tube. End member 11 is provided with openings 15 and 16 as well as a central opening 13 corresponding to a similar recess or opening 14 in end member 12. As shown in FIG. 2, the tube 10 is assembled between end cap members 11 and 12, and a central core or shaft 17 for the roll is then inserted through opening 13 with the opposite end positioned in recess 14. The material of which the roll is to be formed is then poured through opening 15, as illustrated in FIG. 3, opening 16 being provided for the escape of air as the glass tube is filled with the casting material 18. The assembly thus filled with the casting material is then heated, cured, or gelled, or otherwise allowed to solidfy into its final form, after which the end caps are removed and the assembly illustrated in FIG. 4 is obtained, which consists of shaft 17 surrounded by the solidified elastomeric material 18 which, in turn, is enclosed within glass tube 10. The glass tube, which is frangible and expendable, is then crushed by compressing it between rollers or by striking with a solid object until it is cracked, after which the broken or cracked glass is removed from the roll, leaving a smooth surfaced product such as illustrated in FIG. 5.

A number of different types of casting materials may be utilized, such as polyvinyl chloride plastisols, polyurethanes, glue-glycerine compositions, liquid rubber casting compounds, and the like. In the case of vinyl plastisols, for example, the plastisol which has been poured into the glass shell in the manner illustrated in FIG. 3 is cured or gelled by placing the assembly within a furnace heated to a suitable temperature, generally in the range of about 350° F., until gelation of the plastisol occurs. Once this has been done, the assembly is allowed to cool, the end caps removed, and the glass shell is broken or crushed to be removed from the polyvinyl chloride roll which results. In the case of polyurethane materials, the reactant mixture is introduced into the glass shell, also in the manner illustrated in FIG. 3, and the reaction is allowed to go to completion preferably at room temperature and thereafter, if desired may be further cured at elevated temperature as is the common practice with polyurethane resinous materials. Rolls may also be formed of thermosetting materials or resins by introducing the reactant mixture, which may be a Bakelite type of composition or the like, into the glass shell, after which it is introduced into a furnace and heated to temperatures sufficient to cause thermosetting of the resin. In each case, after the resinous material has been completely reacted and has been set to its final condition, the glass shell is removed by breaking. The same principles may be applied to the case of non-resilient, non-elastomeric materials, and solid inflexible rollers may be obtained in the same manner.

Further detailed examples of typical procedures to be utilized in manufacturing these rolls are set forth below.

*Example I*

A typical polyvinyl plastisol casting composition suitable for printing roll use was formulated as follows (all parts by weight):

Polyvinyl chloride (Geon 121—high M.W. polyvinyl chloride) _____ 100
Dioctyl phthalate (plasticizer) _____ 50
Hydrogenated terphenyl (extender-plasticizer) _____ 50
Dibasic lead phosphite (stabilizer) _____ 3

The ingredients are intimately mixed in a conventional type of paint mixer and the viscous liquid mixture poured into a glass shell in the manner shown in FIG. 3 of the drawings, after positioning the end caps and steel core. Prior to pouring, the mixture was deaerated under vacuum. The poured assembly is then heated in an oven in an upright position at 350° F. for about four hours. Fusion and gelation of the plastisol occurs. The assembly is then removed from the oven and allowed to cool. Thereafter, the end caps are removed and the glass shell broken by striking with a mallet. The glass fragments are removed and a polyvinyl chloride printing roll having a smooth surface is obtained.

*Example II*

A synthetic rubber casting composition for rollers was prepared containing a butadiene-acrylic nitrile copolymer, as follows (parts by weight):

Liquid butadiene-acrylic nitrile copolymer (Hycar
  1312—medium acrylicnitrile) _____ 100
Zinc Oxide _____ 5
Sulfur _____ 20
Accelerator-dithiocarbamate (Butyl 8) _____ 3.0

The above ingredients are intimately mixed in a Hobart type mixer and then cast in the manner described in Example I. Vulcanization is effected by heating for 24 hours at 250° F. A roll suitable as a printing roll or for other purposes, having a Shore A durometer hardness of about 75, is obtained after removing the glass shell by breaking it. Similar compositions may be prepared using other known rubber compounding agents, accelerators, and the like.

*Example III*

A polyurethane resin casting composition was prepared as follows:

A polyester resin was prepared by reacting 1 mol of adipic acid, 1 mol of diethylene glycol and 0.5 mol of trimethylol propane. These materials were reacted in a flask at a temperature of 135° C. with stirring while gradually increasing the temperature to 200° C., in an inert atmosphere of nitrogen. The resulting polymer has a hydroxyl number of 50 and a water content of about 0.2%. 100 parts by weight of the resin are then mixed with about 50 parts of toluene diisocyanate and the mixture allowed to react under vacuum until the viscosity begins to increase, at which point it is poured into a glass shell in the manner illustrated in FIG. 3. The reaction is allowed to go to completion in the shell and allowed to stand upright for 24 hours. At that time the shell is removed by breaking it with a mallet and removing the fragments. The product is a clear, soft, flexible roll suitable for use as a printing roll or for other purposes.

*Example IV*

A glue-glycerine casting composition is prepared in the conventional manner by dissolving 32 parts by weight of gelatin and 4 parts of glue in water, along with 4 parts of glucose, 72 parts of glycerine and 1 part methyl alcohol. The mixture is digested for 4 to 6 hours and then cast into the assembly of FIG. 3 as described above. The composition was allowed to set and solidify for 48 hours and the completed roll then removed by breaking away the glass shell. A smooth surfaced printing roll of the glue-glycerine type is obtained.

Other roller compositions suitable for casting and solidification within the frangible shell may be utilized in a similar manner. Thermosetting resins of the phenol-aldehyde type may be used in this manner to form rolls of the harder type. Instead of glass as the frangible material, tubes or shells of other ceramic materials such as pottery or clay may also be used.

The inventor claims:

The method of making a printing roll having a shaft with an elastomeric material molded thereon which presents an outer highly regular and smooth cylindrical surface and which utilizes as a mold a frangible glass tube with a highly regular and smooth internal surface and a wall capable of withstanding the molding operation and capable of being cleanly shattered without blemishing the desired cylindrical surface of the roll, comprising the steps of positioning the frangible glass tube between a pair of end members, positioning the shaft centrally and axially within said tube, introducing a reactive polyurethane resin mixture into the tube to surround said shaft, solidifying the polyurethane resin mixture within the tube, and removing the glass tube from the surface of the solidified resin mixture by breaking it into pieces to uncover the desired highly regular and smooth cylindrical surface.

References Cited in the file of this patent

UNITED STATES PATENTS

| | | |
|---|---|---|
| 48,453 | Sentell | June 27, 1865 |
| 413,803 | Kennedy | Oct. 29, 1889 |
| 753,959 | Crump | Mar. 8, 1904 |
| 830,432 | Hennessey | Sept. 4, 1906 |
| 2,217,734 | Dreyfus | Oct. 15, 1940 |
| 2,303,303 | Schleicher | Nov. 24, 1942 |
| 2,353,194 | Sherman | July 11, 1944 |
| 2,633,796 | Pethick | Apr. 7, 1953 |
| 2,677,165 | Copenhaver et al. | May 4, 1954 |
| 2,729,618 | Muller et al. | Jan. 3, 1956 |

FOREIGN PATENTS

| | | |
|---|---|---|
| 500,298 | Great Britain | Feb. 7, 1939 |
| 749,541 | Great Britain | May 30, 1956 |

OTHER REFERENCES

Baird: P.V.C. Paste; "British Plastics"; April 1948, pp. 167, 171.